March 20, 1928.
J. R. COOKE
FISH GUARD
Filed July 3, 1926
1,663,398
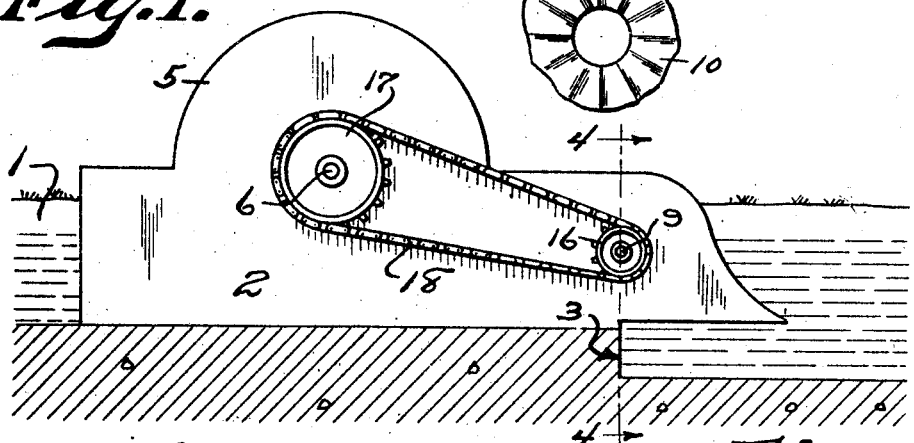
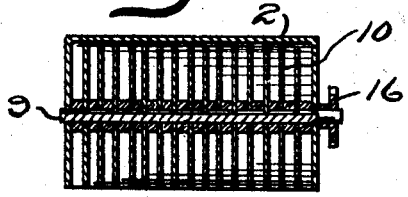
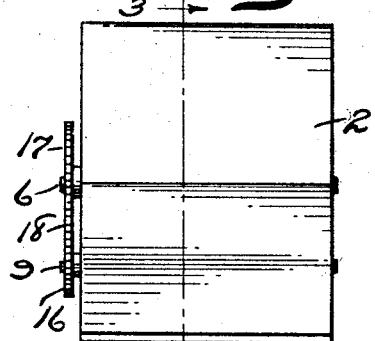
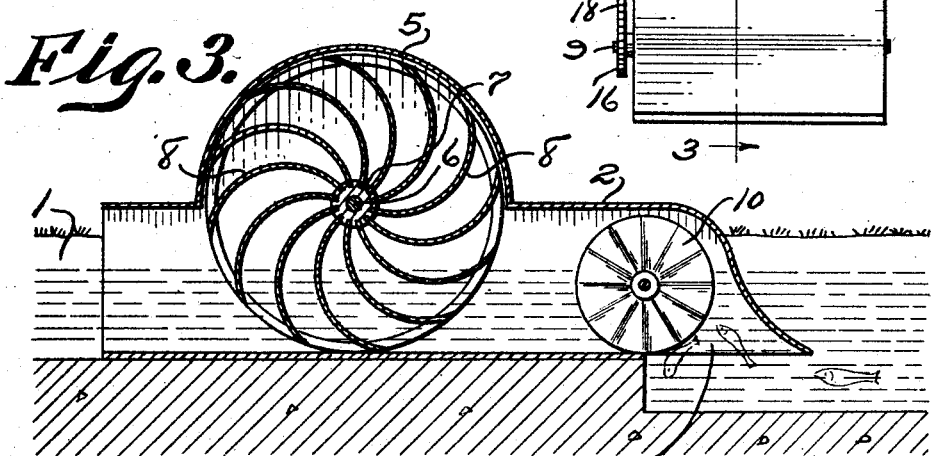
Joe R. Cooke
INVENTOR Patented Mar. 20, 1928.

1,663,398

UNITED STATES PATENT OFFICE.

JOE R. COOKE, OF ODEM, TEXAS, ASSIGNOR OF ONE-HALF TO JESSE E. PALMER, OF KERRVILLE, TEXAS.

FISH GUARD.

Application filed July 3, 1926. Serial No. 120,338.

The object is the provision of a simple but thoroughly effective means for preventing fish from entering irrigation ditches which is characterized by simplicity in construction and reliability and efficiency in practical use.

To the attainment of the foregoing the invention consists in the improvement as hereinafter described and definitely claimed.

In the drawings:

Figure 1 is a side elevation of the improvement in applied position.

Figure 2 is an end view thereof.

Figure 3 is a sectional view on the line 3—3 of Figure 2.

Figure 4 is a sectional view on the line 4—4 of Figure 1.

Figure 5 is a fragmentary elevation of one of the obstructing discs.

In the bottom of an irrigation ditch 1, I arrange the casing 2 of the improvement. The casing 2 projects over the wall 3 that divides the ditch from a flowing stream. The end of the casing 2 that is received in the ditch 1 is fully open, but the end of the casing received in the stream is closed. The bottom of the casing may be wholly open but, if closed, that portion thereof received in the stream is open, as at 4. The top of the casing has an arched enlargement 5, the sides of the casing, of course, extending into the said arch. Journaled centrally in this portion of the casing there is a shaft 6 on which there is fixed a hub 7 that is provided with curved radially disposed equidistantly spaced blades 8. These blades are contacted by the water that flows through the ditch so that the water wheel thus provided is revolved by the current of the stream flowing into the ditch. Arranged transversely adjacent the end of the casing provided with the opening 4 in the bottom thereof, there is a shaft 9. On this shaft 9 there are any desired number of spaced discs 10. The discs may be flat or corrugated radially from the center thereof.

Fixed on one end of the shaft 9 there is a sprocket wheel 16 and also fixed on one end of the shaft 6 there is a larger sprocket wheel 17. Trained around these sprocket wheels there is an endless chain 18. By this arrangement it will be seen that the turning of the water wheel will revolve the shaft 6 which through the instrumentality of the sprockets and the chain 18, will revolve the shaft 11, so that a continuous motion is imparted to the discs 10 and these spaced discs will contact with fish attempting to enter the ditch 1 and prevent such entrance, and these revolving discs will prevent any trash or foreign matter passing from the stream into the ditch.

Having described the invention, I claim:—

A guard for irrigation ditches comprising a casing employed between the ditch and the feeding stream, the said casing shaped so as to allow access to the water thru only one opening positioned in the bottom thereof, a revolving screen formed of discs set closely on the same shaft closing the opening whereby the turning movement of the screen forces any solid matter back out the opening and a means for operating the revolving screen.

In testimony whereof I affix my signature.

JOE R. COOKE.